US009486914B1

(12) United States Patent
Frolander

(10) Patent No.: US 9,486,914 B1
(45) Date of Patent: Nov. 8, 2016

(54) PLUMBER'S CREEPER HAVING IMPROVED HEIGHT ADJUSTMENT CAPABILITY AND PROVIDING ENHANCED UPPER BODY SUPPORT

(71) Applicant: John Frolander, San Marcos, CA (US)

(72) Inventor: John Frolander, San Marcos, CA (US)

( * ) Notice: Subject to any disclaimer, the term of this patent is extended or adjusted under 35 U.S.C. 154(b) by 0 days.

(21) Appl. No.: 14/737,282

(22) Filed: Jun. 11, 2015

(51) Int. Cl.
| *B25H 5/00* | (2006.01) |
| *A47C 16/00* | (2006.01) |
| *A47C 9/02* | (2006.01) |
| *B62B 3/02* | (2006.01) |
| *B62B 1/12* | (2006.01) |

(52) U.S. Cl.
CPC ............... *B25H 5/00* (2013.01); *A47C 9/027* (2013.01); *A47C 16/005* (2013.01); *B62B 1/12* (2013.01); *B62B 3/02* (2013.01)

(58) Field of Classification Search
CPC ............ B25H 5/00; B62B 3/02; A47C 9/027
See application file for complete search history.

(56) References Cited

U.S. PATENT DOCUMENTS

| 68,811 | A | * | 9/1867 | Van Doren | B65G 69/30 |
| | | | | | 280/32 |
| 1,368,716 | A | * | 2/1921 | Gontrum | B25H 5/00 |
| | | | | | 280/32.6 |
| 2,729,905 | A | * | 1/1956 | Crozier | D06F 81/00 |
| | | | | | 108/33 |
| 2,843,391 | A | * | 7/1958 | Pelletier | B25H 5/00 |
| | | | | | 108/116 |
| 2,872,252 | A | * | 2/1959 | Konkle | B25H 5/00 |
| | | | | | 108/147.21 |
| 3,407,899 | A | * | 10/1968 | Delafrange | A47C 3/34 |
| | | | | | 182/20 |
| 3,677,569 | A | * | 7/1972 | Larson | B62B 3/02 |
| | | | | | 108/44 |
| 3,949,436 | A | * | 4/1976 | Fawess | A47C 9/027 |
| | | | | | 297/391 |
| 4,580,799 | A | * | 4/1986 | Quinonez | A47C 9/022 |
| | | | | | 280/32.6 |
| 4,741,512 | A | * | 5/1988 | Elkuch | B66F 7/065 |
| | | | | | 248/421 |
| 4,895,380 | A | * | 1/1990 | Brooks | B25H 5/00 |
| | | | | | 280/32.6 |
| 4,925,245 | A | * | 5/1990 | Pendleton | A47C 17/14 |
| | | | | | 297/111 |

(Continued)

FOREIGN PATENT DOCUMENTS

JP 3119184 B2 * 12/2000 ............... B25H 5/00

*Primary Examiner* — J. Allen Shriver, II
*Assistant Examiner* — Steve Clemmons
(74) *Attorney, Agent, or Firm* — Doherty IP Law Group LLC

(57) ABSTRACT

A plumber's creeper includes a lower body support having an inner frame with wheels and an outer frame telescopically received over the inner frame. The outer frame slides telescopically over the inner frame for adjusting the height of the lower body support. A height adjustment element coupled with the outer frame has a locked position for preventing height adjustment and an unlocked position for enabling sliding telescopic movement of the outer frame relative to the inner frame for adjusting the height of the lower body support. An upper body support is connected with the lower body support via a hinge that enables the upper body support to be folded over the lower body support. The plumber's creeper has an unfolded configuration in which the top surface of the upper body support and the top surface of the lower body support lie in a common plane.

19 Claims, 15 Drawing Sheets

(56) References Cited

U.S. PATENT DOCUMENTS

| | | | | |
|---|---|---|---|---|
| 4,986,558 A * | 1/1991 | Morris | | B25H 5/00 280/32.6 |
| 5,002,293 A * | 3/1991 | Gottselig | | B62B 3/02 108/145 |
| 5,022,670 A * | 6/1991 | Cote | | B25H 5/00 280/32.6 |
| 5,078,280 A * | 1/1992 | Nordeen | | B25H 5/00 211/119.003 |
| 5,451,068 A * | 9/1995 | Shockley | | B25H 5/00 280/32.6 |
| 5,895,062 A * | 4/1999 | Miles | | B25H 5/00 280/32.6 |
| 6,398,234 B1 * | 6/2002 | Brown | | B25H 5/00 280/30 |
| 6,871,861 B2 | 3/2005 | Hernandez, Jr. | | |
| D503,867 S * | 4/2005 | Bennette | | D6/601 |
| 7,070,189 B2 * | 7/2006 | Grauss | | B25H 5/00 108/147 |
| 7,178,868 B2 * | 2/2007 | Richardson | | A47C 9/027 297/195.11 |
| 7,293,783 B2 * | 11/2007 | Whiteside | | B25H 5/00 280/32.5 |
| 7,305,728 B2 | 12/2007 | Schlieps | | |
| 7,958,574 B1 | 6/2011 | Bodeen et al. | | |
| 8,056,908 B2 * | 11/2011 | Scott | | B25H 5/00 280/32.6 |
| 8,505,138 B1 * | 8/2013 | Minichiello | | A47C 16/00 280/32.6 |
| 8,596,651 B2 * | 12/2013 | Canova | | A47C 3/36 280/32.5 |
| 9,242,369 B1 * | 1/2016 | Richmond, Jr. | | B25H 5/00 |
| 2001/0024022 A1 * | 9/2001 | Antirose | | B25H 5/00 280/32.6 |
| 2006/0200909 A1 * | 9/2006 | Beck | | A47C 9/027 5/652 |
| 2007/0176378 A1 * | 8/2007 | Bangs | | B25H 5/00 280/32.6 |
| 2008/0093810 A1 * | 4/2008 | Liu | | B25H 5/00 280/32.6 |
| 2008/0309035 A1 | 12/2008 | Whiteside et al. | | |
| 2010/0066069 A1 * | 3/2010 | Bradshaw | | B60R 9/06 280/769 |
| 2011/0049822 A1 * | 3/2011 | Hinman | | B25H 5/00 280/32.6 |

\* cited by examiner

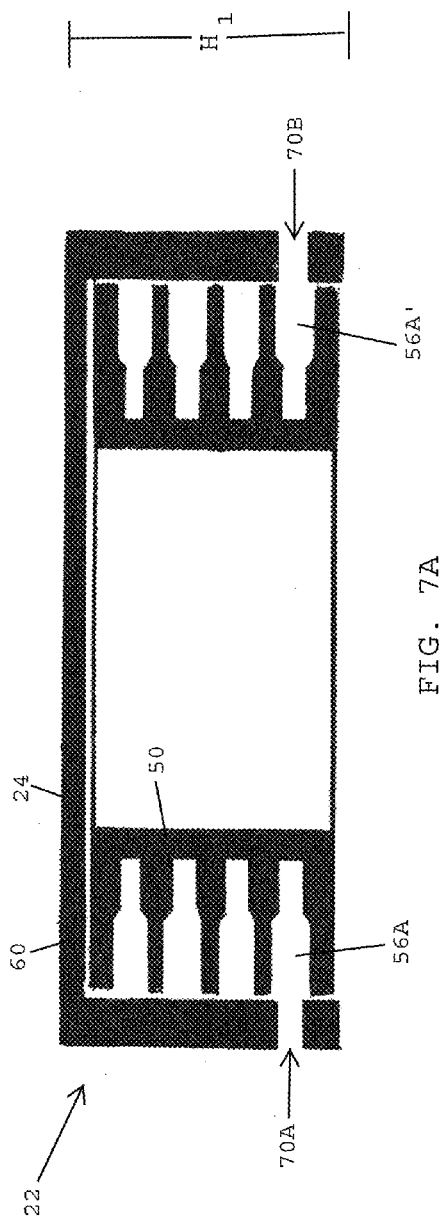
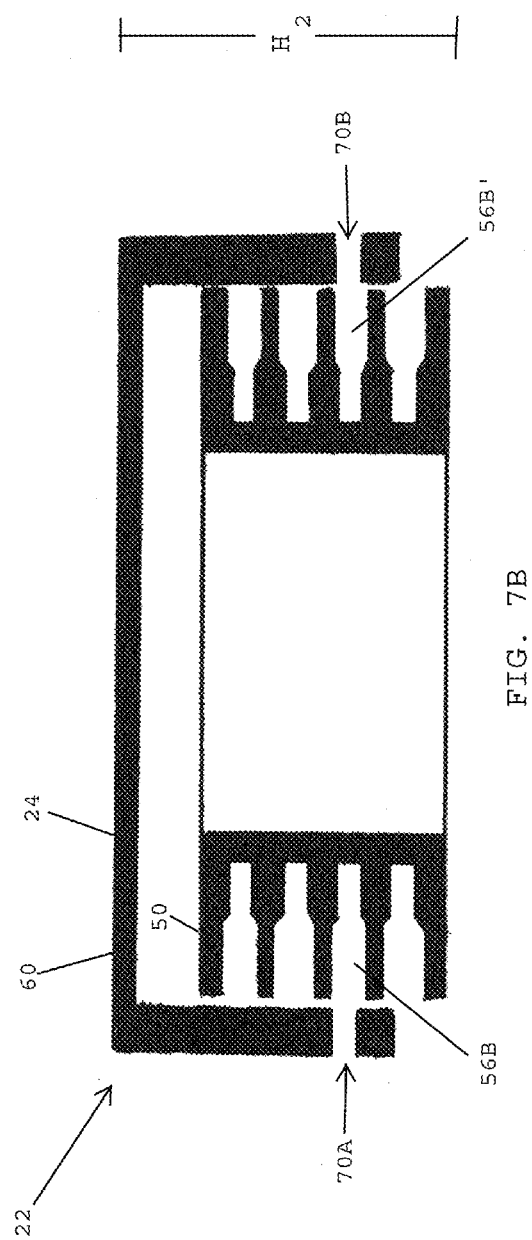
FIG. 7A
FIG. 7B

PLUMBER'S CREEPER HAVING IMPROVED HEIGHT ADJUSTMENT CAPABILITY AND PROVIDING ENHANCED UPPER BODY SUPPORT

BACKGROUND OF THE INVENTION

1. Field of the Invention

The present invention is generally related to creepers having wheels for rolling over a surface, and is more specifically related to plumber's creepers used under sinks and inside cabinets.

2. Description of the Related Art

A creeper is a movable platform on which an individual lies on his or her back in order to maneuver into or underneath low and confined spaces. Plumber's creepers are designed to facilitate working underneath kitchen sinks and inside cabinets having a surface that is raised relative to a floor surface. The plumber's field has developed various devices to address the particular nuances of a worker lying on his or her back, while attempting to navigate inside the cabinet, and while supporting his or her upper body weight over two different heights for the floor surface and the cabinet floor. For conventional cabinets, the height difference between the floor surface and the cabinet floor is typically about 3.5 to 5.5 inches.

There have been numerous attempts directed to providing plumber's creepers. For example, U.S. Pat. No. 3,677,569 to Larson discloses a foldable creeper having a lower body support with four wheels mounted thereon and an extender for supporting the upper body having a single wheel mounted on the underside thereof. The extender is connected to the lower body support via a hinge so that the extender can be folded over the lower body support. The wheels on the lower body support are designed to be positioned on a floor surface and the single wheel on the extender is designed to be positioned on a cabinet floor having a greater height than the floor surface. Larson does not enable an operator to adjust the height of the creeper to accommodate cabinet floors having different heights.

U.S. Patent Application Publication No, 2011/0049822 to Hinman discloses a plumber's creeper for supporting a person in a generally horizontal position. The creeper has a bottom side having wheels mounted thereon and a top side having a foam pad or cushion. The wheels are attached to the underside of the support platform and allow the device to be moved and maneuvered by the user. The wheels are affixed and positioned such that the head end of the creeper is cantilever supported beyond the forward most wheels to enable a person to enter the opening of a sink type cabinet door and navigate above the raised toe kickboard and cabinet floor while the creeper wheels remain on the floor outside of the cabinet. The wheels have locking pins that enable a worker to adjust the height of the platform to accommodate varying cabinet toe kickboard heights. The platform head end supports the person's head and upper torso while working within the confined cabinet space. The platform head end has an inwardly tapered section including two substantially semi-circle cutouts so that the device can be moved into cabinets having a smaller entry port than the full width of the device.

In spite of the above advances, there are many drawbacks associated with prior art creepers. First, in the Larson design, the single wheel on the extender does not provide sufficient lateral support for a worker's upper body as the worker rolls from side to side, which will result in the creeper tipping inside the cabinet. Second, in the Larson design, the single wheel mounted on the underside of the extender results in all of the worker's weight being concentrated onto the single wheel, which may result in the wheel denting or marring the surface of the cabinet floor. Third, the Larson device does not provide for height adjustment so that it cannot be modified to work well inside cabinets having different cabinet floor heights.

These deficiencies are not overcome by the Hinman reference, which discloses a creeper that provides no support for the upper body, which will result in the upper section of the creeper tipping inside the cabinet, and which will cause stress and strain on the user due to there being no lateral support inside the cabinet. Moreover, the Hinman device has a very complex procedure for adjusting the height of the creeper whereby locking pins must be removed from each wheel and then re-installed. In Hinman, the locking pins may be misplaced or lost, which renders the device useless for its intended use.

Thus, there remains a need for improved plumber's creepers that may be used inside cabinets having different cabinet floor heights, that may be easily adjusted to different heights, that provide enhanced support for an upper body as a user rolls from side to side inside a cabinet, that facilitate rolling movement of the upper body portion of the creeper inside a cabinet, that minimize the chances of exposure to chemicals and liquids present inside the cabinet, and that will not damage or mar the surface of the cabinet floor as the creeper rolls over a cabinet floor.

SUMMARY OF THE INVENTION

In one embodiment, the plumber's creeper disclosed herein uses the structural strength of the cabinet to support the upper body of user, which avoids the shifting of body-weight and center of gravity issues encountered with prior art creepers that utilize a cantilever approach.

In one embodiment, the upper body support uses elongated rollers that extend across the width of the upper body section to avoid and/or minimize the likelihood of marring or scratching the cabinet. This is an improvement over creepers having a single wheel that supports the upper body inside the cabinet. It is also an improvement over creepers using a cantilever design which has the potential to tip and have a throw bar scratch the inside of a cabinet.

In one embodiment, the upper body support is not dramatically tapered inwardly toward the head, thereby allowing a user to roll from shoulder to shoulder on either side, which enables a user to reach significantly further into the cabinet while retaining firm, padded support.

Tapered creepers provide less support to the upper body, which may cause the user to strain when reaching for a remote section of the cabinet. Tapered creepers also increase the chances that a user may come in contact with the cabinet floor, which may have chemical residue from chemicals stored under a sink, or which may have water/moisture from leaking pipes, valves, etc.

Prior art creeper devices provide tool drawers that must be pulled open to access tools stored therein. This design makes it difficult for an operator to open a drawer and access the tools while lying on his or her back. It may also be difficult to open drawers due to the drawers being blocked by the doors of a cabinet. In contrast, in one embodiment, the present invention discloses a plumber's creeper having tool wings located on each side of the lower body support. The tool wings are essentially storage bins that are open at the top to provide for easy access to the hand tools stored therein.

The plumber's creeper disclosed herein provides for one step height adjustment by engaging height adjustment levers. Prior art devices require a multi-step process whereby locking pins are removed and repositioned for four different wheels. The prior art systems may result in loss of the locking pins.

The present invention provides a plumber's creeper that may be used under sinks and inside cabinets to perform work. The plumber's creeper disclosed herein provides enhanced, stable support, enhanced comfort, and maximized the range of movement inside the cabinet while still providing upper body support. The plumber's creeper disclosed herein also minimizes the likelihood of damaging the cabinet floor because the upper body support uses elongated rollers that spread the user's weight across the width of the upper body support instead of at one wheel location.

When working under a sink, there is a tremendous amount of shifting of position going on in order to reach around drains, garbage disposals, water lines, and electrical supply lines. The leverage required to tighten connections constantly shifts a user's weight from the lower body to the upper body. Cantilevered creepers have inherent instability and tip when a user shift's his or her body weight. When a cantilevered creeper tips, it may scratch or mar the cabinet floor, which is undesirable.

In one embodiment, the plumber's creeper disclosed herein has a wider upper body support with elongated rollers extending across the width of the upper body support for providing maximum support and comfort. The elongated rollers support a user as the user rolls from shoulder to shoulder of side to side to reach remote locations inside the cabinet. Providing enhanced lateral support reduces the amount of time and energy required to accomplish a required task, and projects may be completed with less stress and strain on the body.

Using elongated rollers that extend across the width of the upper body support prevents sharp or pointed edge contact between the upper body support and the floor of a cabinet.

The one step level adjustment feature disclosed herein saves a tremendous amount of time and provides a major convenience. Any time elements must be detached from a main body (e.g., removing locking pins from vertical wheel shafts to adjust height) there is an increased chance that items will be lost.

In one embodiment, a plumber's creeper preferably includes a lower body support having an inner frame with wheels mounted to an underside thereof and an outer frame telescopically received over the inner frame, whereby the outer frame is adapted for sliding telescopic movement relative to the inner frame for adjusting the height of the lower body support The plumber's creeper desirably includes a height adjustment element coupled with the outer frame, the height adjustable element having a locked position in which the height adjustable element is in contact with both the outer and inner frames for preventing sliding telescopic movement of the outer and inner frames relative to one another for preventing height adjustment of the lower body support, and an unlocked position in which the height adjustable element is in contact with the outer frame and not in contact with the inner frame for enabling sliding telescopic movement of the outer frame relative to the inner frame for adjusting the height of the lower body support. The plumber's creeper preferably includes an upper body support connected with the lower body support via a hinge that enables the upper body support to be folded over the lower body support. The plumber's creeper has a folded configuration in which a top surface of the upper body support opposes a top surface of the lower body support and an unfolded configuration in which the top surface of the upper body support and the top surface of the lower body support lie in a common plane.

In one embodiment, the upper body support preferably has elongated rollers mounted over a bottom surface thereof. The elongated rollers desirably extend across the width of the upper body support for spreading the weight of a user's body across the width of the upper body support.

In one embodiment, when the plumber's creeper is in an unfolded configuration, the wheels mounted on the inner frame of the lower body support and the elongated rollers mounted on the upper body support are at different heights. In one embodiment, the wheels on the inner frame will be positioned on a floor surface and the rollers on the upper body support will be positioned in a cabinet floor that is at a different height than the floor surface.

In one embodiment, the inner frame has first and second lateral side walls having a series of vertically aligned height adjustment holes formed therein. The vertically aligned height adjustment holes desirably extend from a lower end of the inner frame toward an upper end of the inner frame. The centers of the height adjustment holes may be spaced about 0.5 inches away from an adjacent hole.

In one embodiment, when the plumber's creeper is in the locked position, the height adjustment element is extended into the height adjustment holes of the inner frame. When the plumber's creeper is in the unlocked position, the height adjustment element is retracted from and not in contact with the height adjustment holes of the inner frame for enabling the outer frame to slide relative to the inner frame.

In one embodiment, the height adjustment element desirably includes a first height adjustment lever located on a first lateral side of the outer frame and a second height adjustment lever located on a second lateral side of the outer frame. The first and second height adjustment levers may have spring loaded pins that are normally extended into the height adjustment holes. The height adjustment levers may be pulled away from the sides of the outer frame for retracting the pins from the height adjustment holes for adjusting the height of the lower body support. When a desired height has been attained, the levers may be released for locking the position of the outer frame relative to the inner frame.

In one embodiment, each of the spring loaded pins desirably includes a spring that normally urges the spring loaded pin into the extended position. When the spring loaded pin is retracted into the unlocked position, energy is stored in the spring.

In one embodiment, the wheels mounted on the inner frame are caster wheels so that the lower body support is unidirectional. In one embodiment, the elongated rollers mounted on the upper body support preferably include a series of rollers spaced from one another between a distal end of the upper body support and a proximal end of the upper body support. The elongated rollers in any one of the series of rollers desirably extend the majority of the way across the width of the upper body support.

In one embodiment, the plumber's creeper may include a latch provided on the lower body support for securing the upper body support in the folded configuration. In one embodiment, the latch is provided on the lower body support and a latch flange is provided on the upper body support. The latch may engage the latch flange for holding the creeper in the folded configuration.

In one embodiment, the lower body support preferably has a box-like shape, and the outer frame also has a box-like shape with an inner dimension that closely matches an outer dimension of the inner frame. In one embodiment, the inner surface of the outer frame preferably slides over an outer surface of the inner frame during telescopic movement of the outer frame over the inner frame.

In one embodiment, a plumber's creeper preferably includes a lower body support including an inner frame having caster wheels mounted to an underside thereof for enabling the lower body support to roll over a floor surface. The lower body support desirably has an outer frame telescopically received over the inner frame, whereby the outer frame has a top surface, and whereby the outer frame is adapted for sliding telescopic movement relative to the inner frame for adjusting the height of the top surface of the outer frame relative to the floor surface. The plumber's creeper may include a height adjustment element coupled with the outer frame. The height adjustable element preferably has a locked position in which the height adjustable element is in contact with both the outer and inner frames for preventing sliding telescopic movement of the outer and inner frames relative to one another, and an unlocked position in which the height adjustable element is in contact with the outer frame and not in contact with the inner frame for allowing sliding telescopic movement of the outer frame relative to the inner frame for adjusting the height of top surface of the outer frame relative to the floor surface. The plumber's creeper desirably has an upper body support connected with the outer frame of the lower body support via a hinge that enables the upper body support to be folded over the outer frame. The plumber's creeper desirably has a folded configuration in which a top surface of the upper body support opposes the top surface of the outer frame and an unfolded configuration in which the top surface of the upper body support and the top surface of the outer frame lie in a common plane. As a result, the wheels of the lower body support may be positioned on the floor surface and the rollers of the upper body support may be positioned over a cabinet floor having a different height than the floor surface.

These and other preferred embodiments of the present invention will be described in more detail below.

BRIEF DESCRIPTION OF THE DRAWING

FIGS. 7A-7D show a cross-sectional view of the lower body support of FIGS. 1 and 2 with the outer frame at different heights relative to the inner frame.

DETAILED DESCRIPTION

Figure 1:
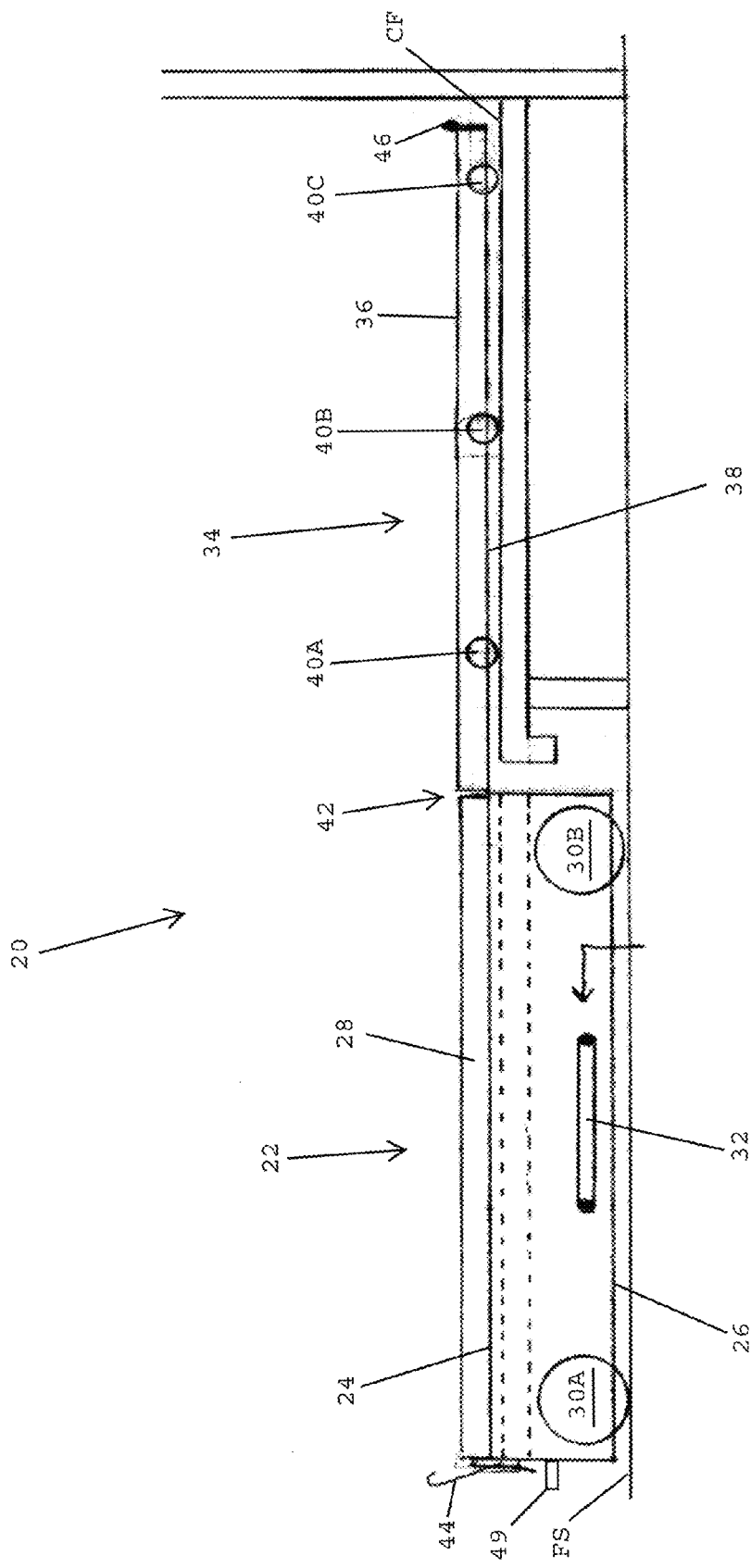
FIG. 1 shows a side elevation view of a plumber's creeper including a lower body support and an upper body support, in accordance with one embodiment of the present invention.

Referring to FIG. 1, in one embodiment, a height-adjustable plumber's creeper 20 preferably includes a lower body support 22 having a top surface 24 and a bottom surface 26. A first pad 28 desirably overlies the top surface 24 of the lower body support 22 to provide cushioning support for an individual positioned atop the plumber's creeper. The lower body support 22 preferably includes wheels 30, such as caster wheels, that project below the bottom surface 26 of the lower body support so that the lower body support may roll over a surface, such as a floor surface FS. In FIG. 1, only two wheels 30A, 30B are shown, however, in certain preferred embodiments, the lower body support may have four wheels that enable the lower body support to easily roll over surfaces. The wheels may be evenly spaced from one another around the perimeter of the lower body support, such as in the four corners of the lower body support. In one embodiment, the wheels may include a wide variety of swiveling, pivoting, gliding, sliding, rolling, revolving, rotating or otherwise suitable casters, wheels or rollers configured to provide maximum maneuverability.

The plumber's creeper desirably includes at least one height adjustment lever 32 that enables an operator to adjust the height of the top surface 24 of the lower body support 22 relative to the floor surface FS. In one embodiment, the plumber's creeper has a height adjustment lever 32 provided on both sides of the lower body support. As will be described in more detail herein, the height adjustment levers are spring loaded and may be retracted for enabling the height of the lower body support to be adjusted and set at a desired height.

Figure 2:
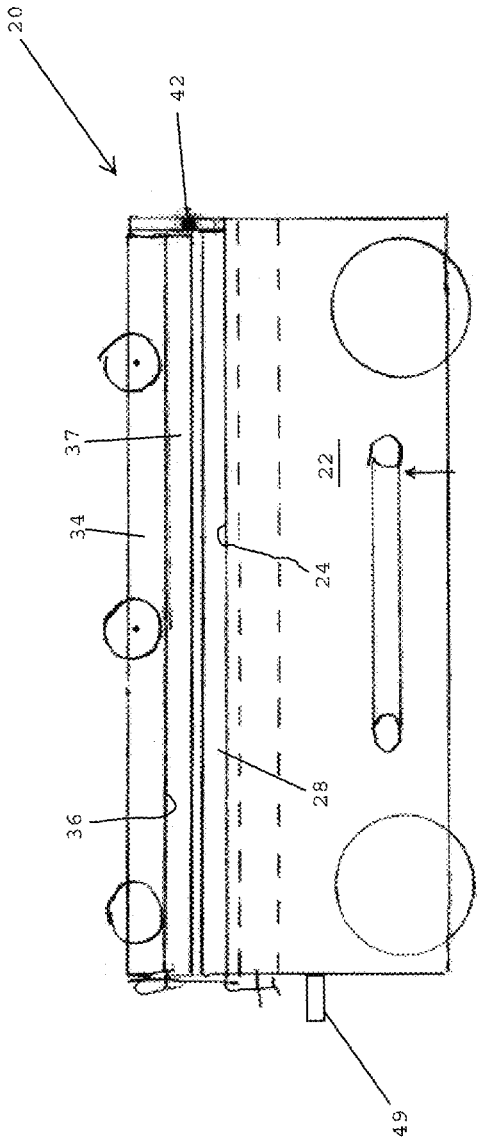
FIG. 2 shows the plumber's creeper of FIG. 1 with the upper body support folded over the lower body support.

In one embodiment, plumber's creeper 20 desirably includes an upper body support 34 having a top surface 36 and a bottom surface 38. The top surface 36 of the upper body support 34 may be covered by a cushioning pad 37 (FIG. 2). The upper body support 34 preferably includes elongated rollers 40A, 40B, 40C that are mounted to the underside of the upper body support and that project below the bottom surface 38 of the upper body support 34 for enabling the upper body support to roll over a surface, such as a cabinet floor CF. The upper body support 34 and the lower body support 22 are preferably connected together via a hinge 42 that enables the upper body support to be folded over the lower body. In one embodiment, it may be desirably to place the plumber's creeper in the folded configuration for storing and/or transporting the creeper. The lower body support 22 desirably has a latch 44 and the upper body support desirably has a latch flange 46 that is engaged by the latch 44 for holding the upper body support 34 in the folded configuration (FIG. 2).

Referring to FIG. 2, in one embodiment, the upper body support 34 is folded over the lower body support 22 so that the pad 37 over the top surface 36 of the upper body support opposes the pad 28 over the top surface 24 of the lower body support 22. The latch 44 on the lower body support 22 engages the latch flange 46 on the upper body support 34 for holding the creeper 20 in the folded configuration. The hinge 42 enables the creeper to transform from the unfolded configuration shown in FIG. 1 to the folded configuration shown in FIG. 2. The creeper may be repeatedly transformed from the folded configuration to the unfolded configuration and back again.

Referring to FIGS. 1 and 2, in one embodiment, the plumber's creeper 20 desirably includes a carrying handle 49 that enables the creeper to be picked up and carried from one location to another location. In one embodiment, the carrying handle 49 is accessible at the outer surface of the lower body support 22. The carrying handle 49 may be moveable between a folded, storage configuration, and an extended, carrying configuration. The carrying handle 49 may include a pivot or hinge that enables the carrying handle to move from the folded configuration to the extended configuration.

Figure 3A:
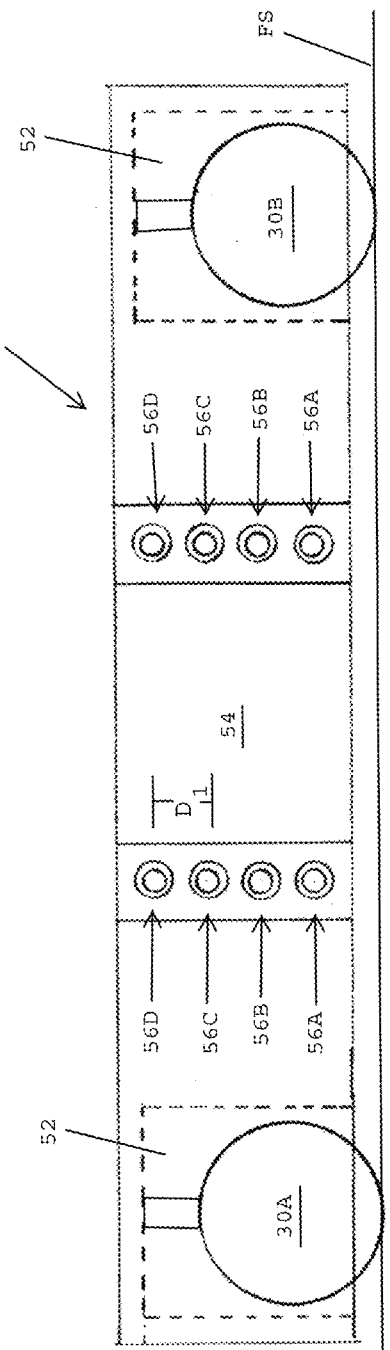
FIG. 3A shows a side elevation view of an inner frame of the lower body support of the plumber's creeper shown in FIGS. 1 and 2.

Referring to FIG. 3A, in one embodiment, the lower body support 22 (FIG. 1) preferably includes an inner frame 50 having wheels 30A, 30B mounted within wheel recesses 52. The inner frame 50 desirably has a first side wall 54 with a series of height adjustment holes 56A-56D that enable the lower body support to be adjusted to different heights. In one embodiment, the height adjustment holes 56 for each level include a pair of height adjustment holes. In one embodiment, there are two spaced holes 56A at a first height level, two spaced holes 56B at a second height level, etc.

In one embodiment, the series of height adjustment holes 56A-56D are vertically aligned with one another and have centers that are spaced about ½ inch from one another. In one embodiment, the centers of the respective holes 56A-56D are spaced a distance D1 of about 0.5 inches from one another. The above dimensions may be modified and still fall within the scope of the present invention.

Figure 3B:
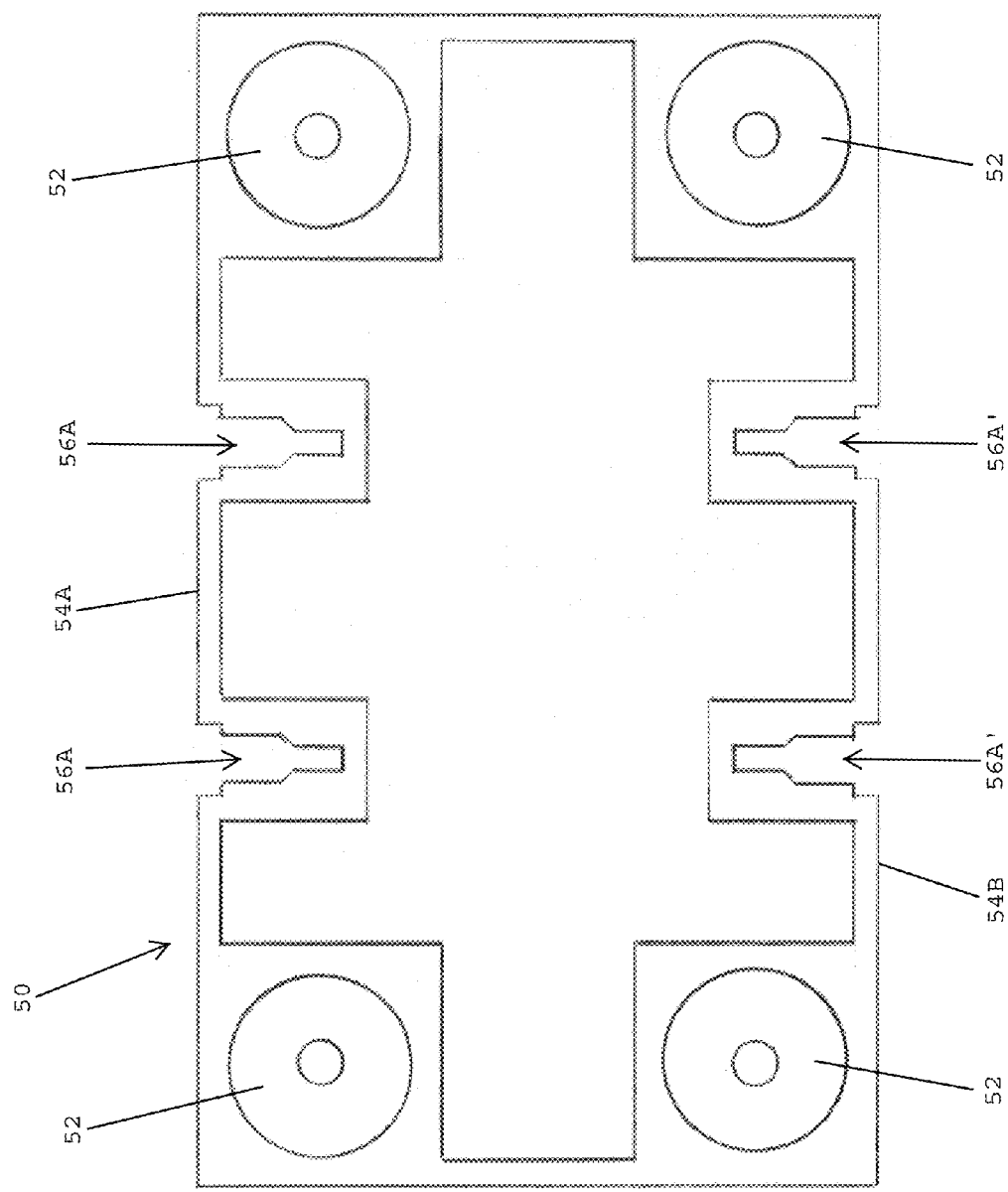
FIG. 3B shows a top plan view of the inner frame of the lower body support shown in FIG. 3A.

Referring to FIG. 3B, in one embodiment, the inner frame 50 of the lower body support 22 (FIG. 1) preferably includes the first side wall 54A, a second side wall 54B, a first end wall 55A and a second end wall 55B. The pair of spaced height adjustment holes 56A in the first side wall 54A are desirably aligned with the pair of spaced height adjustment holes 56A' in the second side wall 54B. The wheel recesses 52 are preferably positioned adjacent the four corners of the lower frame 50. The wheels 30 (FIG. 3A) may be caster-like wheels that are mounted within the wheel recesses 52 so that the lower body support may roll in any direction over a floor surface.

Figure 4:
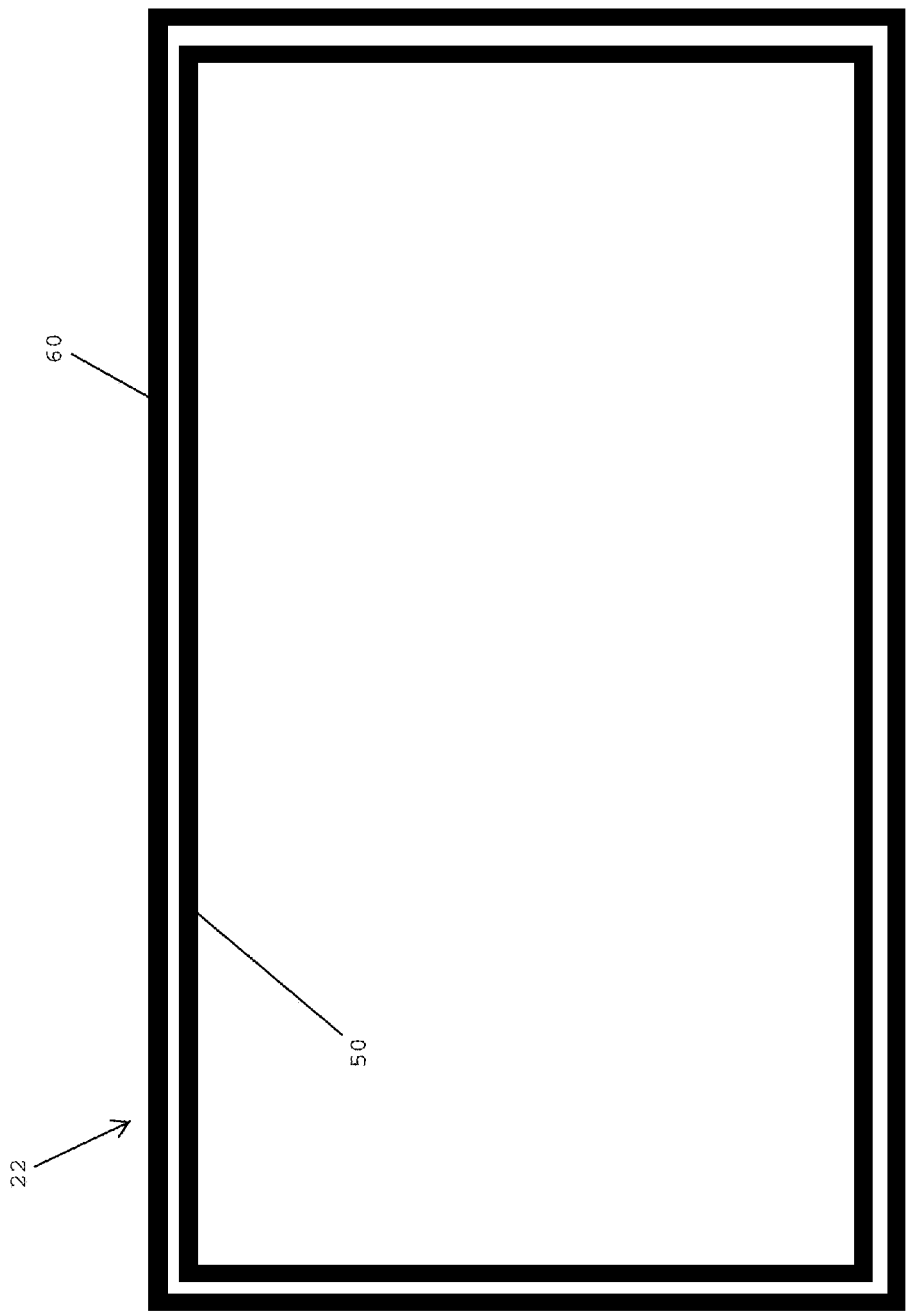
FIG. 4 shows a schematic view of the lower body support of the plumber's creeper of FIGS. 1 and 2, the lower body support having an inner frame and an outer frame telescopically received over the inner frame.

Referring to FIG. 4, in one embodiment, the lower body support 22 preferably includes the inner frame 50 and an outer frame 60 that is telescopically received over the inner frame and that slides over the inner frame for adjusting the height of the lower body support. The sliding, telescopic movement of the outer frame over the inner frame enables the position of the outer frame 60 to be adjusted relative to the inner frame 50. In one embodiment, an outer dimension of the inner frame 50 closely matches the inner dimension of the outer frame 60 so that the inner surface of the outer frame slides over the over surface of the inner frame when adjusting the height of the lower body support. When a desired height has been attained, the height adjustment levers 32 (FIG. 1) may be inserted into the height adjustment holes formed in the inner frame to desirably hold the outer frame 60 at a selected height relative to the inner frame 50.

Figure 5:
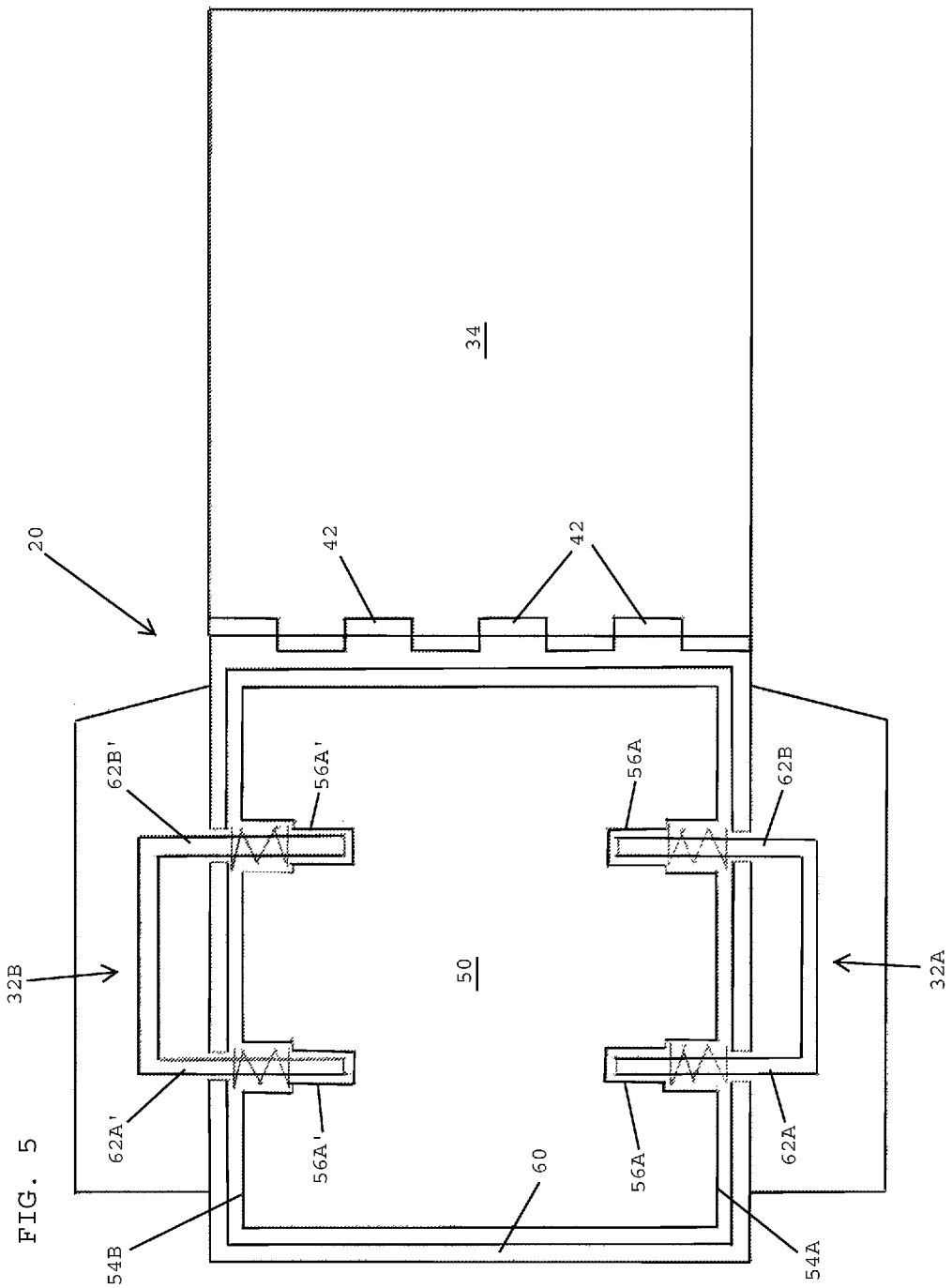
FIG. 5 shows a top plan view of a plumber's creeper including a lower body support having an inner frame and an outer frame, an upper body support hingedly connected with the lower body support, and a pair of height adjustment elements accessible at the sides of the lower body support, in accordance with one embodiment of the present invention.

Referring to FIG. 5, in one embodiment, a first height adjustment lever 32A projects from a first side wall of the lower body support 22, and a second height adjustment lever 32B projects from a second side wall of the lower body support. The first height adjustment lever 32A preferably has a pair of spring loaded pins 62A, 62B that are adapted to pass through the height adjustment holes 56A provided in the first side wall 54A of the inner frame 50. The second height adjustment lever 32B desirably has a pair of spring loaded pins 62A', 62B' that are adapted to pass through the height adjustment holes 56A' provided in the second side wall 54B of the inner frame 50. In operation, the height adjustment levers 32A, 32B are preferably retracted (i.e., pulled away from one another) for enabling the outer frame 60 to slide up or down relative to the inner frame for adjusting the height of the lower body support. When a desired height has been attained, the height adjustment levers may be released for locking the position of the outer frame 60 relative to the inner frame 50.

As shown in FIG. 5, in one embodiment, the upper body support 34 is connected to the lower body support 22 via a hinge connection 42, which enables the upper body support to be folded over the lower body support 22.

Figure 6:
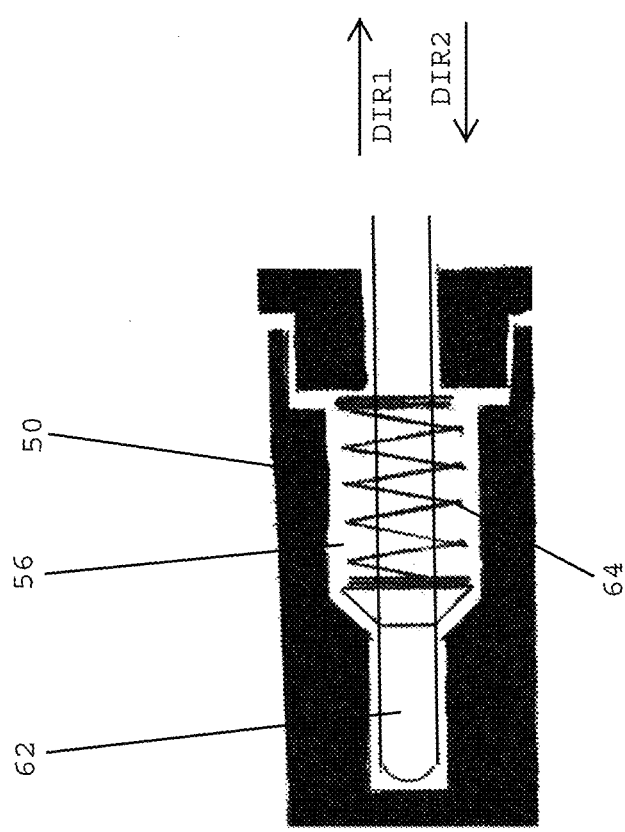
FIG. 6 shows a spring loaded pin of one of the height adjustment elements shown in FIG. 5, in accordance with one embodiment of the present invention.

Referring to FIGS. 5 and 6, in one embodiment, each height adjustment lever 32A, 32B preferably includes at least one spring loaded pin 62 that is adapted for insertion into one of the height adjustment holes 56 provided in the inner frame 50 for holding the position of the outer frame 60 relative to the inner frame 50. In one embodiment, each spring loaded pin 62 desirably includes a spring 64 that is compressed when the pin 62 is pulled in a first direction DIR1 for retracting the pin 62 from the hole 56 so that a height adjustment may be made. When a desired height adjustment has been achieved, the height adjustment lever 32 (FIG. 5) may be released so that the compressed spring 64 may urge the pin 62 to move in the direction DIR2 for extending the distal end of the pin into the hole 56 for holding the height of the outer frame 60 relative to the inner frame 50.

Figure 7C:
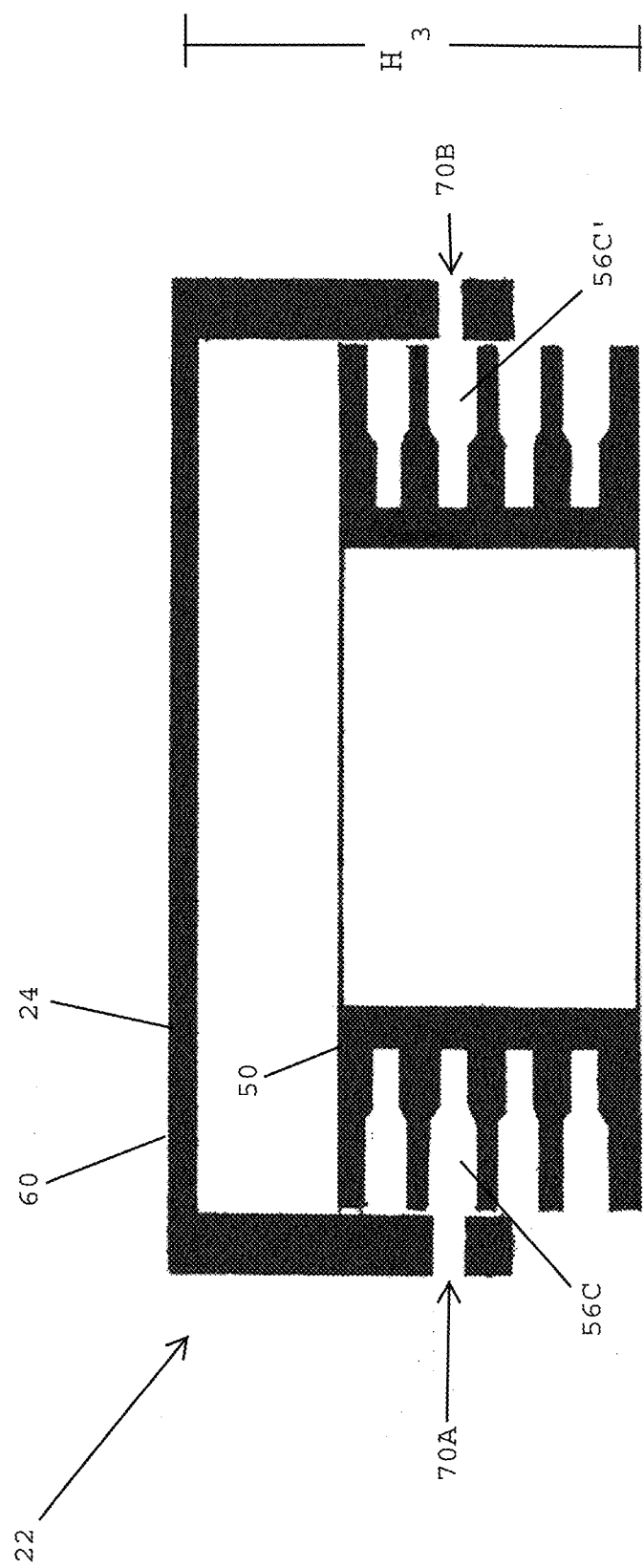

FIGS. 7A-7D show the top surface 24 of the lower body support 22 at various heights relative to the floor surface FS. In FIGS. 7A-7D the wheels 30 (FIG. 1) have been removed for improving clarity. In FIG. 7A, height adjustment holes 70A, 70B in the outer frame 60 are aligned with the first height adjustment holes 56A, 56A' formed in the inner frame 50 so that the top surface 24 of the lower body support 22 is at a first height $H_1$ above a floor surface FS. The pins 62 (FIG. 6) of the height adjustment lever may be inserted through the aligned holes 70A, 56A and 70B, 56A' for holding the position of the outer frame 60 relative to the inner frame 50.

In FIG. 7B, height adjustment holes 70A, 70B in the outer frame 60 are aligned with the second height adjustment holes 56B, 56B' formed in the inner frame 50 so that the top surface 24 of the lower body support 22 is at a second height H$_2$ above a floor surface FS. The second height H2 is greater than the first height H$_1$ (FIG. 7A). The pins 62 (FIG. 6) of the height adjustment lever may be inserted through the aligned holes 70A, 56B and 70B, 56B' for holding the position of the outer frame 60 relative to the inner frame 50.

In FIG. 7C, height adjustment holes 70A, 70B in the outer frame 60 are aligned with the third height adjustment holes 56C, 56C' formed in the inner frame 50 so that the top surface 24 of the lower body support 22 is at a third height H$_3$ above a floor surface FS. The third height H3 is greater than the second height H$_2$ (FIG. 7B). The pins 62 (FIG. 6) of the height adjustment lever may be inserted through the aligned holes 70A, 56C and 70B, 56C' for holding the position of the outer frame 60 relative to the inner frame 50.

Figure 7D:
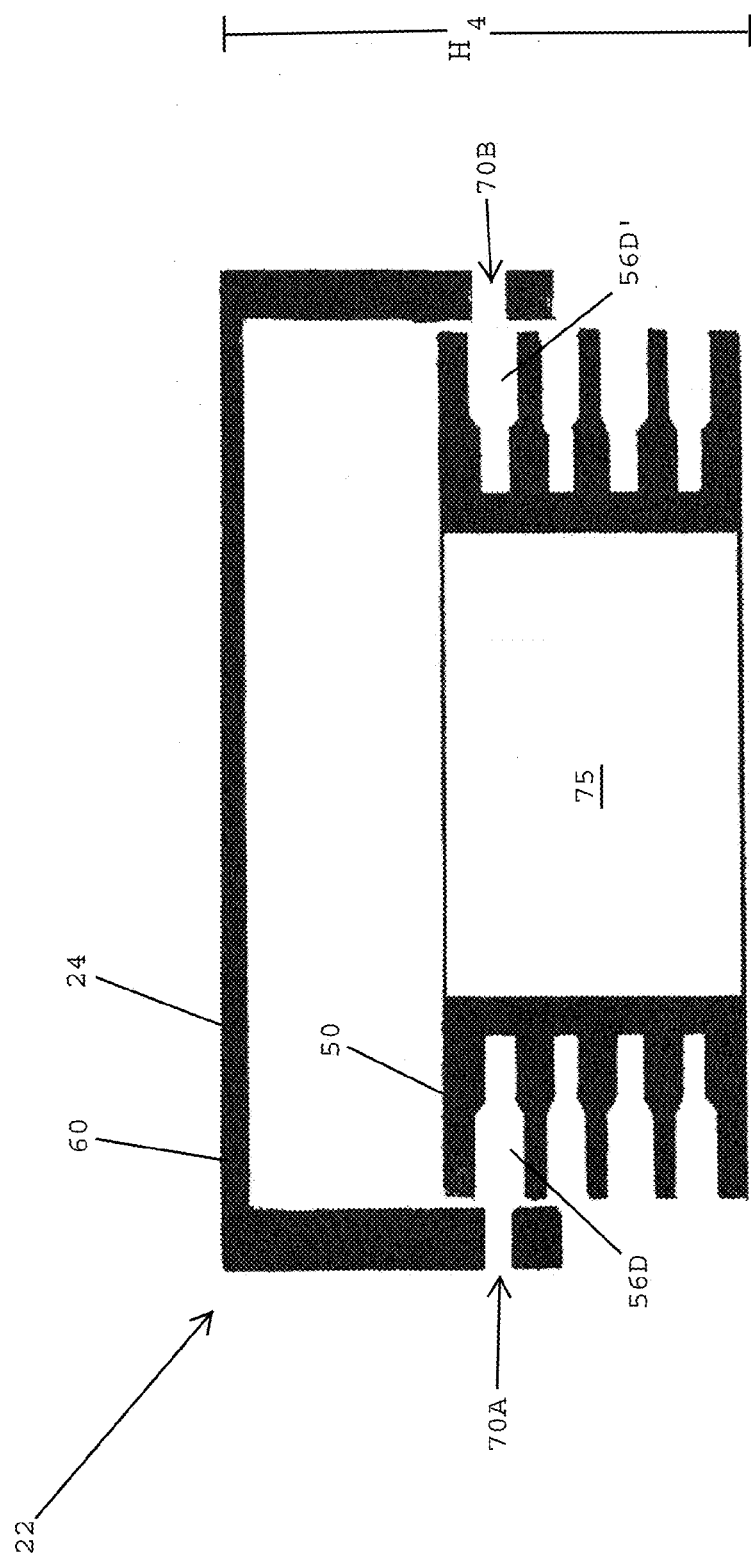

In FIG. 7D, height adjustment holes 70A, 70B in the outer frame 60 are aligned with the fourth height adjustment holes 56D, 56D' formed in the inner frame 50 so that the top surface 24 of the lower body support 22 is at a fourth height H$_4$ above a floor surface FS. The fourth height H$_4$ is greater than the third height H$_3$ (FIG. 7C). The pins 62 (FIG. 6) of the height adjustment lever may be inserted through the aligned holes 70A, 56D and 70B, 56D' for holding the position of the outer frame 60 relative to the inner frame 50.

Referring to FIG. 7D, in one embodiment, the lower body support 22 may include a storage compartment 75 provided therein for storing tools. In one embodiment, the storage compartment 75 is located inside the inner frame 50 of the lower body support 22. The tool wings described herein may also be stored within the storage compartment 75.

Figure 8:
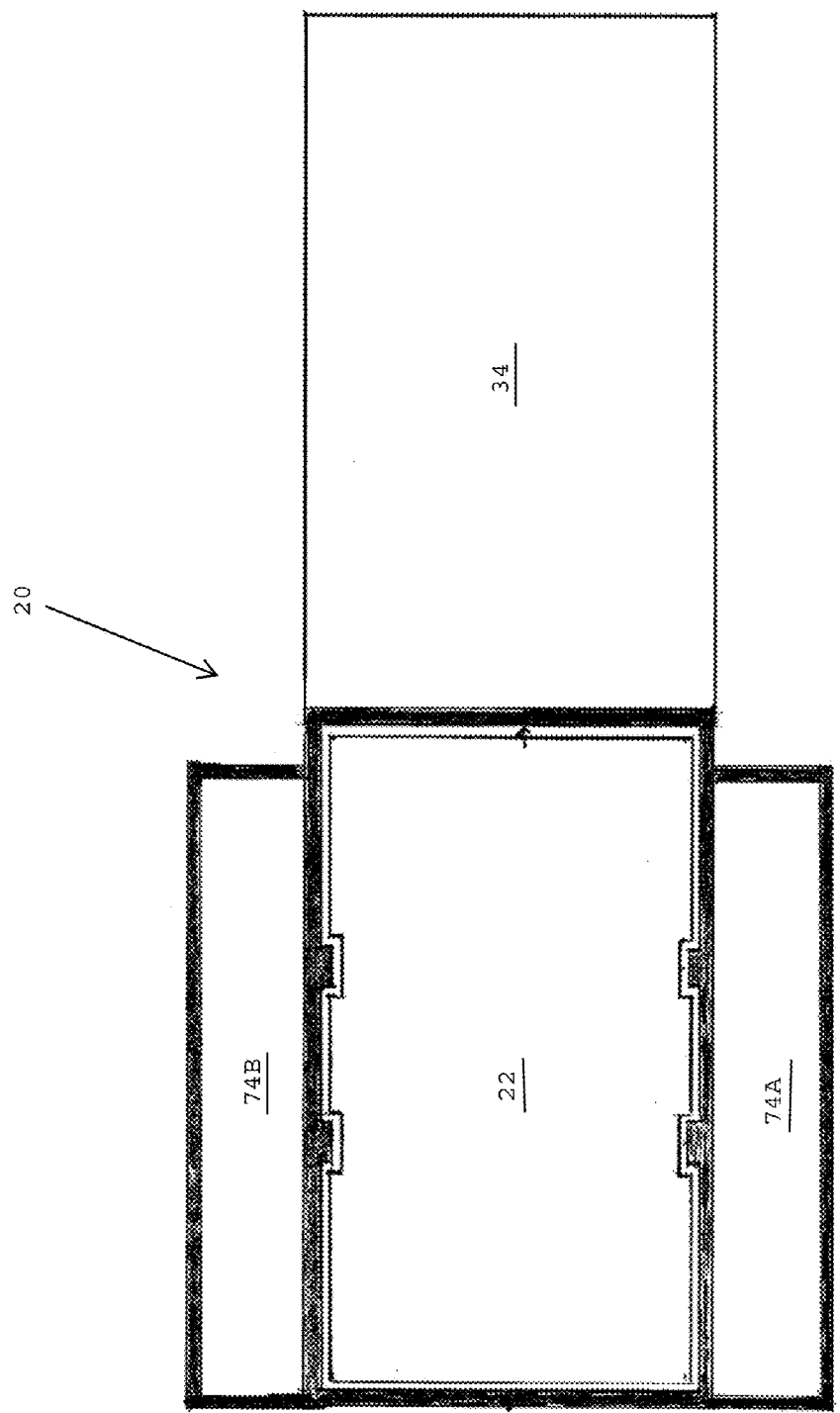
FIG. 8 shows a top plan view of a plumber's creeper including a lower body support, an upper body support hingedly connected with the lower body support, and a pair of tool wings secured to opposite sides of the lower body support, in accordance with one embodiment of the present invention.

Referring to FIG. 8, in one embodiment, a plumber's creeper 20 may include first and second tool wings 74A, 74B that are desirably secured to the sides of the lower body support 22. The tool wings 74A, 74B preferably provide a location for storing tools that may be used by an operator. The location of the tool wings 74A, 74B allow an operator to access tools when lying on his or her back atop the lower body support 22 and the upper body support 34.

Figure 9:
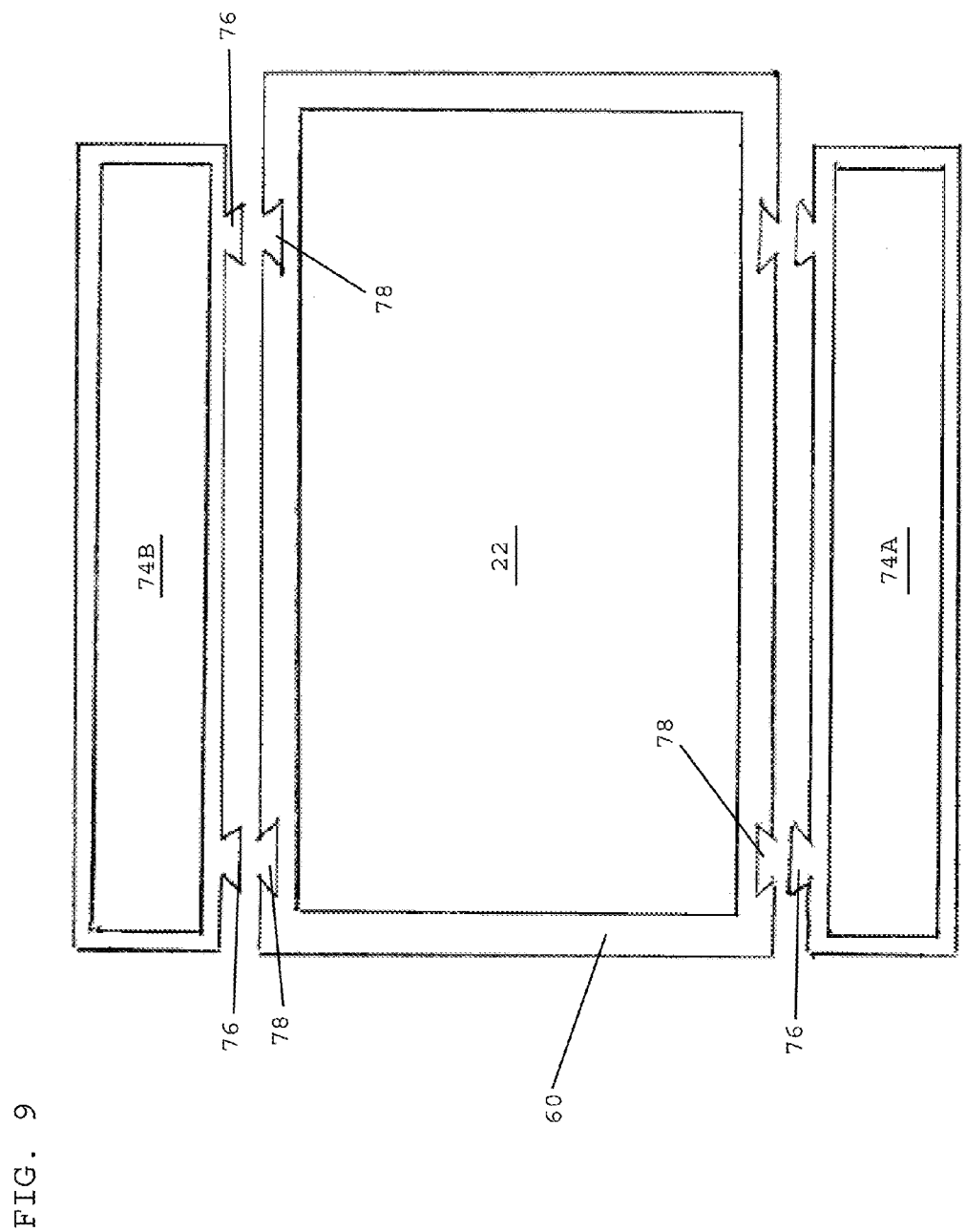
FIG. 9 shows a top plan view of a lower body support of a plumber's creeper and removable tool wings adapted to be secured to the sides of the lower body support.

Referring to FIG. 9, in one embodiment, the first and second tool wings 74A, 74B are removable from their attachment with the lower body support 22. In one embodiment, tongue and groove structure is used for securing the tool wings with the outer frame 60 of the lower body support 22. In FIG. 9, the tool wings 74A, 74B have tongues 76 and the outer surface of the outer frame 60 has grooves 78 that receive the tongues 76. In other embodiments, the grooves may be provided on the tool wings and the tongues may be provided on the outer frame 60.

Figure 10:
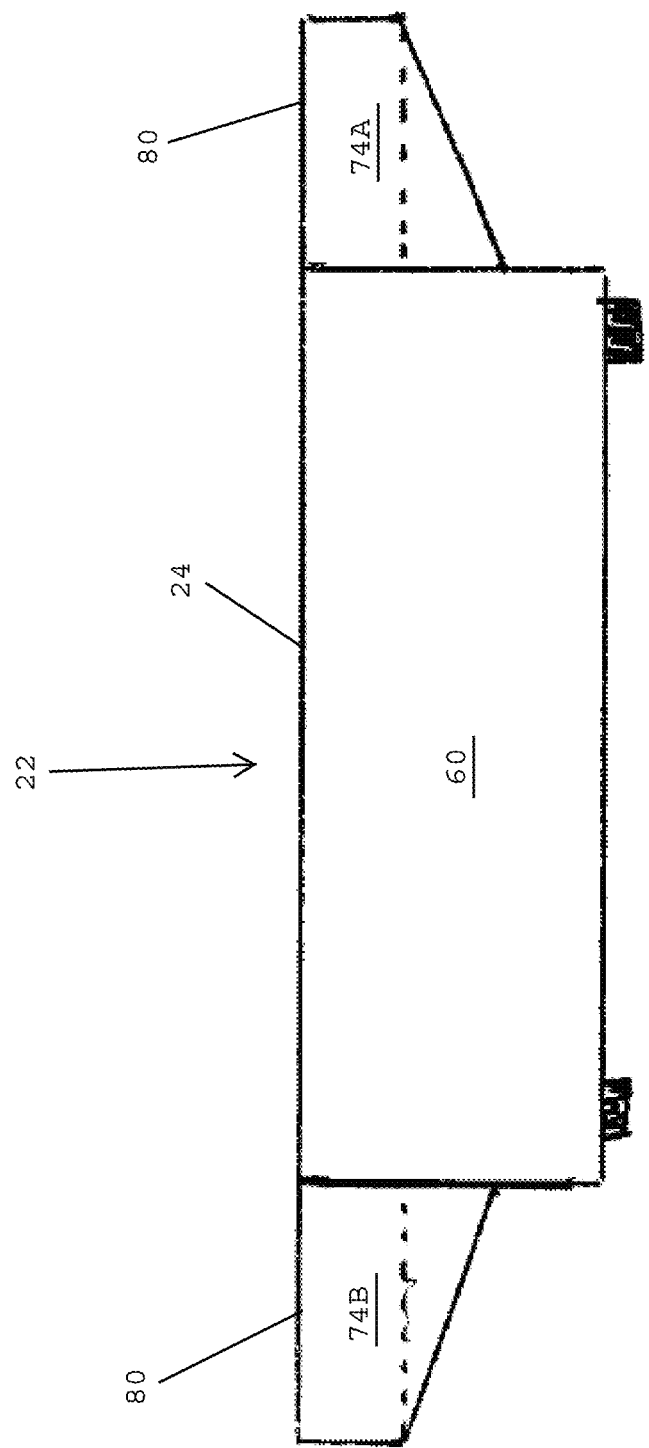
FIG. 10 shows an end view of a plumber's creeper including a lower body support having tool wings secured to the opposite sides of the lower body support.

Referring to FIG. 10, in one embodiment, the first and second tool wings 74A, 74B preferably project laterally from the side walls of the outer frame 60 of the lower body support 22. The tool wings 74A, 74B preferably have recesses formed therein for storing tools on each side of the lower body support 22. In one embodiment, the tool wings 74A, 74B have upper edges 80 that lie in a common plane with the top surface 24 of the lower body support 22.

Figure 11:
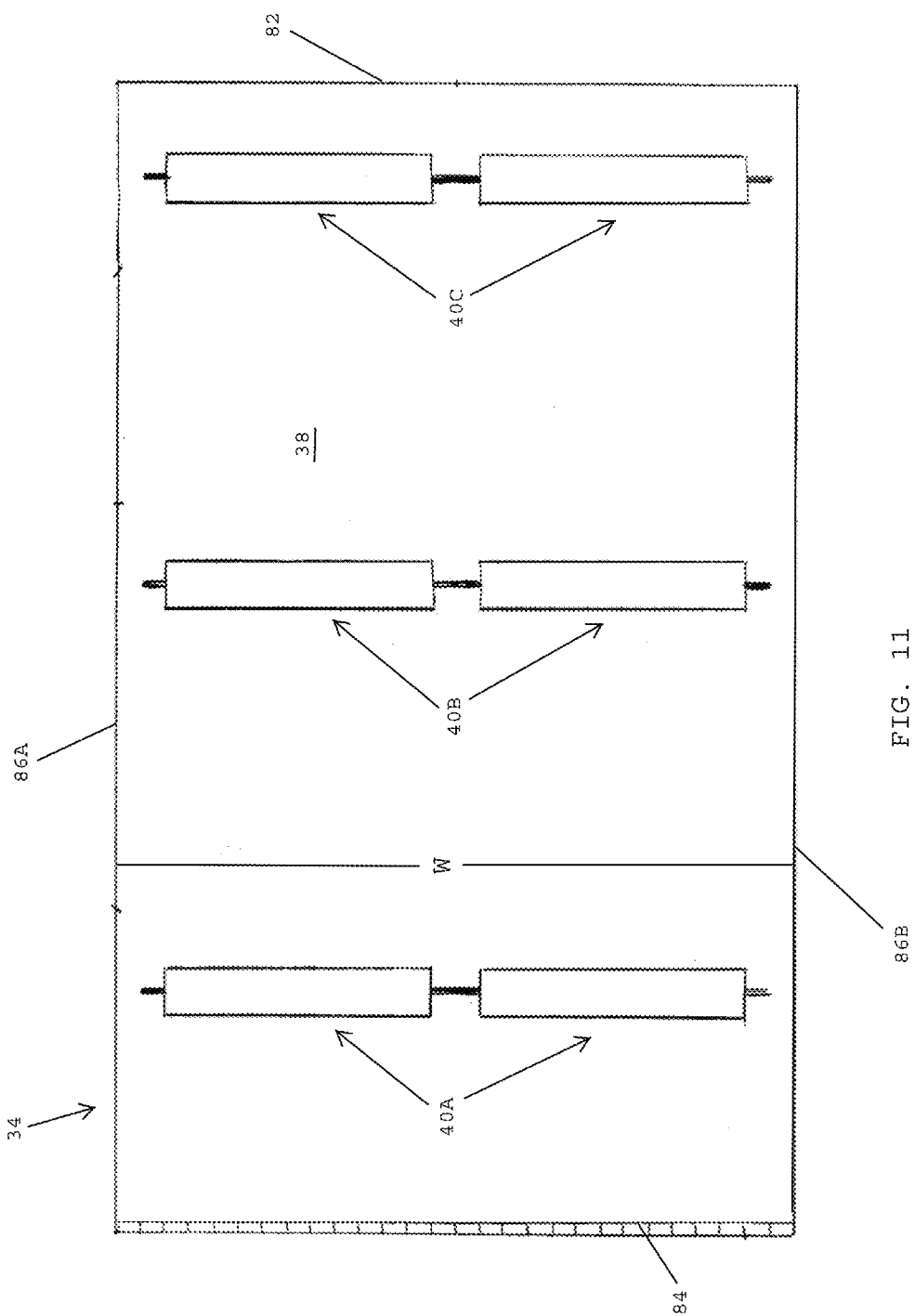
FIG. 11 shows a bottom view of the upper body support of the plumber's creeper shown in FIGS. 1 and 2, in accordance with one embodiment of the present invention.

Referring to FIG. 11, in one embodiment, the upper body support 34 has bottom surface 38 and a series of elongated rollers 40A, 40B, and 40C mounted over the bottom surface 38 for enabling the upper body support to roll over a surface such as a cabinet floor. The upper body support has a distal end 82, a proximal end 84 that is hingedly connected with the lower body support, and first and second lateral sides 86A, 86B that extend between the distal and proximal ends 82, 84. In one embodiment, the elongated rollers in the first series 40A extend the majority of the way across the width W of the upper body support 34. The other series 40B and 40C have similar properties. The elongated rollers 40A, 40B, and 40C are an improvement over the caster wheels found in prior art devices because they extend across the majority of the width W of the upper body support for providing greater support as an operator shifts his or her body weight from side to side on the upper body support. In addition, the weight of the operator is more evenly spread out over the upper body support for minimizing denting, marring or damaging a cabinet floor as the elongated rollers roll over the cabinet floor. The elongated rollers provide a dramatic improvement of the Larson '569 patent, which has a single wheel that supports the entire upper body weight of an individual positioned over a cabinet floor.

In one embodiment, the plumber's creeper may be made using rugged materials including but not limited to metal, wood, rubber, plastic and/or polymers. The wheels and/or or rollers may be made of suitable materials such as rubber, plastic, resin, polyurethane, synthetic, wood or metal, which will provide low friction maneuverability without damaging, marring or other deleterious effect to floors or cabinet floors.

The plumber's creeper disclosed herein is height adjustable so that it may be readily used inside cabinets having different cabinet floor heights. Moreover, the plumber's creeper enables the top supporting surfaces of the upper and lower body support members to lie in a common plane. The upper body support provides lateral support via the elongated rollers, which minimize the likelihood of damage to the cabinet floor.

Figure 12A:
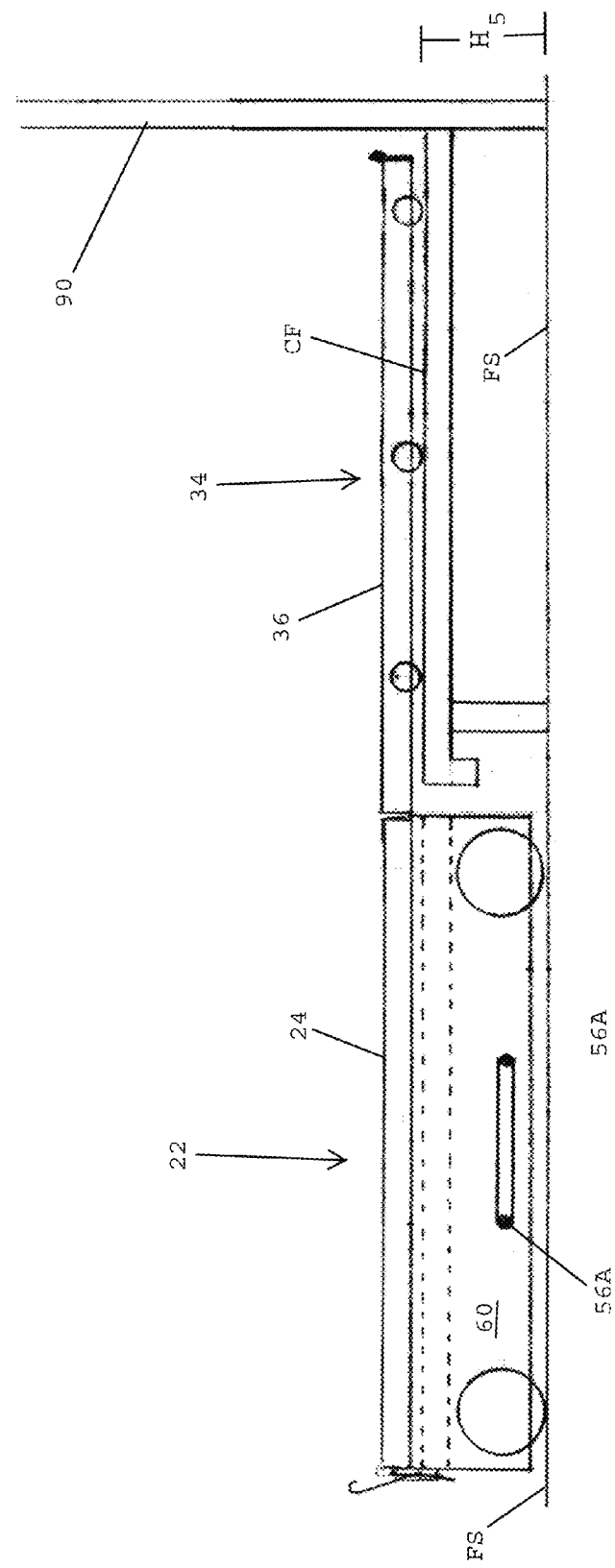
FIG. 12A shows a plumber's creeper overlying a cabinet floor having a first height.

FIG. 12A shows a cabinet 90 having a cabinet floor CF defining a first height H$_5$ relative to a floor surface FS. The upper body support 34 is inserted into the cabinet so that the elongated rollers 40A, 40B, 40C contact the top surface of the cabinet floor CF. The height of the lower body support 22 is then adjusted so that the top surface 24 of the lower body support lies in the same plane as the top surface 36 of the upper body support 34, and so that the respective top surfaces 24, 36 of the upper and lower body supports are parallel with the floor surface FS and the top surface of the cabinet floor CF. In FIG. 12A, the outer frame 60 of the lower body support is positioned at its lowest height, as shown in FIG. 7A.

Figure 12B:
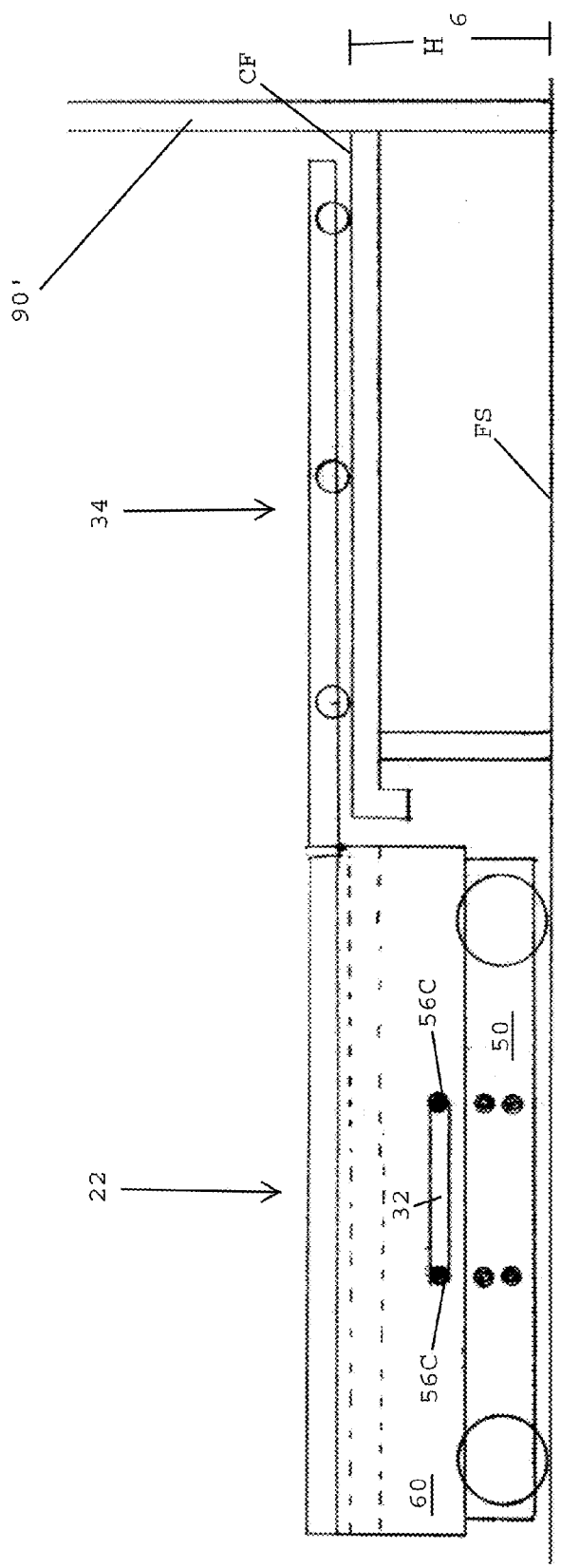
FIG. 12B shows the plumber's creeper of FIG. 12A overlying a cabinet floor having a second height that is greater than the first height of the cabinet shown in FIG. 12A.

FIG. 12B shows a cabinet 90' having a higher cabinet base than the cabinet shown in FIG. 12A. In FIG. 12B, the cabinet 90' has a cabinet floor CF defining a second height H$_6$ relative to a floor surface FS, whereby the second height H6 is greater than the first height H$_5$ shown in FIG. 12A. The upper body support 34 is inserted into the cabinet 90' so that the elongated rollers 40A, 40B, 40C contact the top surface of the cabinet floor CF. The height of the lower body support 22 is then adjusted so that the top surface 24 of the lower body support lies in the same plane as the top surface 36 of the upper body support 34, and so that the respective top surfaces 24, 36 of the upper and lower body supports are parallel with the floor surface FS and the top surface of the cabinet floor CF. In FIG. 12B, the outer frame 60 of the lower body support 22 is positioned at the third height position, as shown in FIG. 7A.

Thus, comparing FIGS. 12A and 12B, it can be observed that the height adjustable plumber's creeper 20 disclosed herein may be readily used in cabinets having cabinet bases with different heights. In FIG. 12A, the creeper is in a lower height position for accommodating a cabinet 90 having a lower cabinet base. In FIG. 12B, the creeper is in a higher height position for accommodating a cabinet 90' having a higher cabinet base. In FIG. 12B, the outer frame 60 is at the third height position relative to the inner frame 50. The height adjustment lever 32 is inserted into the aligned holes to hold the outer frame stable relative to the inner frame 50.

The dimensions disclosed herein are merely examples of one embodiment of the present invention. In other embodiments, the creeper disclosed herein may be modified so that it may be used on larger pieces of equipment such as commercial refrigerators, cold tables, salad bars, etc. The creeper may be utilized anywhere it is necessary to lie on one's back while maintaining and/or repairing equipment and systems. Thus, the size and configuration of the creeper may be modified so that it may be used in different industries.

While the foregoing is directed to embodiments of the present invention, other and further embodiments of the invention may be devised without departing from the basic scope thereof, which is only limited by the scope of the claims that follow. For example, the present invention contemplates that any of the features shown in any of the embodiments described herein, or incorporated by reference herein, may be incorporated with any of the features shown in any of the other embodiments described herein, or incorporated by reference herein, and still fall within the scope of the present invention.

What is claimed is:

1. A plumber's creeper comprising:
    a lower body support including an inner frame having wheels mounted to an underside thereof and an outer frame telescopically received over said inner frame, wherein said outer frame is adapted for sliding telescopic movement relative to said inner frame for adjusting the height of said lower body support;
    a height adjustment element coupled with said outer frame, wherein said height adjustable element has a locked position in which said height adjustable element is in contact with both said outer and inner frames for preventing sliding telescopic movement of said outer and inner frames relative to one another for preventing height adjustment of said lower body support, and an unlocked position in which said height adjustable element is in contact with said outer frame and not in contact with said inner frame for enabling sliding telescopic movement of said outer frame relative to said inner frame for adjusting the height of said lower body support;
    an upper body support connected with said lower body support via a hinge that enables said upper body support to be folded over said lower body support, wherein said plumber's creeper has a folded configuration in which a top surface of said upper body support opposes a top surface of said lower body support and an unfolded configuration in which said top surface of said upper body support and said top surface of said lower body support lie in a common plane;
    wherein said upper body support has elongated rollers mounted over a bottom surface thereof, wherein said elongated rollers extend across the width of said upper body support, wherein said elongated rollers comprise a series of rollers spaced from one another between a distal end of said upper body support and a proximal end of said upper body support, and wherein said elongated rollers in any one of said series of rollers extend the majority of the way across the width of said upper body support;
    wherein said inner frame has first and second lateral side walls having height adjustment holes formed therein that are located at different vertical height levels between a lower end and an upper end of said inner frame, wherein said height adjustment holes located at each of the different vertical height levels includes two height adjustment holes formed in said first lateral side wall of said inner frame and two height adjustment holes formed in said second lateral side wall of said inner frame.

2. The plumber's creeper as claimed in claim 1, wherein when said plumber's creeper is in an unfolded configuration, said wheels mounted on said inner frame and said elongated rollers mounted on said upper body support are at different heights.

3. The plumber's creeper as claimed in claim 1, wherein said height adjustment holes formed in said first lateral side wall of said inner frame are vertically aligned with one another and said height adjustment holes formed in said second lateral side wall of said inner frame are vertically aligned with one another.

4. The plumber's creeper as claimed in claim 3, wherein when in the locked position, said height adjustment element is extended into said height adjustment holes, and when in the unlocked position, the height adjustment element is retracted from and not in contact with said height adjustment holes.

5. The plumber's creeper as claimed in claim 4, wherein said height adjustment element comprises a first height adjustment lever located on a first lateral side of said outer frame and a second height adjustment lever located on a second lateral side of said outer frame, wherein said first height adjustment lever comprises two spring loaded pins that are extended into two of said height adjustment holes formed in said first lateral side wall of said inner frame when in the locked position and retracted from the two of said height adjustment holes formed in said first lateral side wall of said inner frame when in the unlocked position; and
    wherein said second height adjustment lever comprises two spring loaded pins that are extended into two of said height adjustment holes formed in said second lateral side wall of said inner frame when in the locked position and retracted from the two of said height adjustment holes formed in said second lateral side wall of said inner frame when in the unlocked position.

6. The plumber's creeper as claimed in claim 5, wherein each of said spring loaded pins comprises a spring that normally urges said spring loaded pin into the extended position, and wherein energy is stored in said spring when said spring loaded pin is retracted for moving said height adjustable element into said unlocked position.

7. The plumber's creeper as claimed in claim 5, wherein said two height adjustment pins of said first height adjustment lever are interconnected for moving together between the extended and the retracted positions, and said two height adjustment pins of said second height adjustment lever are interconnected for moving together between the extended and retracted positions.

8. The plumber's creeper as claimed in claim 1, wherein said wheels mounted on said inner frame are caster wheels.

9. The plumber's creeper as claimed in claim 1, further comprising a latch provided on said lower body support for securing said upper body support in the folded configuration.

10. The plumber's creeper as claimed in claim 9, wherein said latch is provided on said lower body support and a latch flange is provided on said upper body support.

11. The plumber's creeper as claimed in claim 1, wherein said lower body support has a box shape, and wherein said outer frame has side walls defining an inner dimension that closely matches an outer dimension of said inner frame.

12. The plumber's creeper as claimed in claim 11, wherein an inner surface of said outer frame slides over an outer surface of said inner frame during telescopic movement of said outer frame over said inner frame.

13. A plumber's creeper comprising:
a lower body support including an inner frame having caster wheels mounted to an underside thereof for enabling said lower body support to roll over a floor surface;
said lower body support including an outer frame telescopically received over said inner frame, wherein said outer frame has a top surface, and wherein said outer frame is adapted for sliding telescopic movement relative to said inner frame for adjusting the height of said top surface of said outer frame relative to the floor surface;
a height adjustment element coupled with said outer frame, wherein said height adjustable element has a locked position in which said height adjustable element is in contact with both said outer and inner frames for preventing sliding telescopic movement of said outer and inner frames relative to one another, and an unlocked position in which said height adjustable element is in contact with said outer frame and not in contact with said inner frame for allowing sliding telescopic movement of said outer frame relative to said inner frame for adjusting the height of top surface of said outer frame relative to the floor surface;
wherein said inner frame has first and second lateral side walls, each said side wall having height adjustment holes formed therein that are located at different vertical height levels between a lower end and an upper end of said inner frame, wherein said height adjustment holes located at one of the vertical height levels includes two height adjustment holes formed in said first lateral side wall of said inner frame and two height adjustment holes formed in said second lateral side wall of said inner frame;
wherein said height adjustment element comprises a first height adjustment lever located on a first lateral side of said outer frame and a second height adjustment lever located on a second lateral side of said outer frame, wherein said first height adjustment lever comprises two spring loaded pins that are extended into two of said height adjustment holes formed in said first lateral side wall of said inner frame when in the locked position and retracted from the two of said height adjustment holes formed in said first lateral side wall of said inner frame when in the unlocked position, and wherein said second height adjustment lever comprises two spring loaded pins that are extended into two of said height adjustment holes formed in said second lateral side wall of said inner frame when in the locked position and retracted from the two of said height adjustment holes formed in said second lateral side wall of said inner frame when in the unlocked position; and
an upper body support connected with said outer frame of said lower body support via a hinge that enables said upper body support to be folded over said outer frame, wherein said plumber's creeper has a folded configuration in which a top surface of said upper body support opposes said top surface of said outer frame and an unfolded configuration in which said top surface of said upper body support and said top surface of said outer frame lie in a common plane.

14. The plumber's creeper as claimed in claim 13, wherein said upper body support has a series of elongated rollers mounted over a bottom surface thereof, wherein said elongated rollers extend across the majority of the width of said upper body support.

15. The plumber's creeper as claimed in claim 14, wherein when said plumber's creeper is in an unfolded configuration, said caster wheels mounted on said inner frame and said elongated rollers mounted on said upper body support are at different heights relative to the floor surface.

16. The plumber's creeper as claimed in claim 13, wherein when in the locked position, said spring-loaded pins of said height adjustment element are extended into said height adjustment holes, and when in the unlocked position, said spring-loaded pins of said height adjustment element are retracted from and not in contact with said height adjustment holes for enabling sliding telescopic movement of said outer frame relative to said inner frame.

17. The plumber's creeper as claimed in claim 16, wherein each of said spring loaded pins comprises a spring that normally urges said spring loaded pin into the extended position, and wherein energy is stored in said spring when said spring loaded pin is retracted for moving said height adjustable element into said unlocked position.

18. A plumber's creeper comprising:
a lower body support including an inner frame having wheels mounted to an underside thereof;
said lower body support including an outer frame telescopically received over said inner frame, wherein said outer frame has a top surface, and wherein said outer frame is adapted for sliding telescopic movement relative to said inner frame;
an upper body support connected with said outer frame of said lower body support, wherein said upper body support has a series of elongated rollers mounted over a bottom surface thereof that extend across the majority of the width of said upper body support;
a height adjustment element coupled with said outer frame, wherein said height adjustable element has a locked position for preventing sliding telescopic movement of said outer and inner frames relative to one another, and an unlocked position for allowing sliding telescopic movement of said outer frame relative to said inner frame for adjusting the height of top surface of said outer frame relative to said inner frame;
said inner frame having first and second lateral side walls having height adjustment holes formed therein that are located at different vertical height levels between a lower end and an upper end of said inner frame, wherein said height adjustment holes located at one of the different vertical height levels includes two holes formed in said first lateral side wall of said inner frame and two holes formed in said second lateral side wall of said inner frame; and
said height adjustment element comprising a first height adjustment lever located on a first lateral side of said outer frame and a second height adjustment lever located on a second lateral side of said outer frame, wherein said first height adjustment lever comprises two spring loaded pins that are extended into two of said holes formed in said first lateral side wall of said inner frame when in the locked position and retracted from the two of said holes formed in said first lateral side wall of said inner frame when in the unlocked position, and wherein said second height adjustment lever comprises two spring loaded pins that are extended into two of said holes formed in said second lateral side wall of said inner frame when in the locked position and retracted from the two of said holes formed in said second lateral side wall of said inner frame when in the unlocked position.

19. The plumber's creeper as claimed in claim 18, wherein said wheels mounted on said inner frame and said elongated rollers mounted on said upper body support are at different vertical height levels.

* * * * *